May 15, 1923.

F. M. PETERS ET AL 1,455,120

DOUGH SHEETING APPARATUS

Filed Jan. 15, 1921     5 Sheets-Sheet 1

Inventors,
Frank M. Peters,
Warren H. Hungerford,
By Fisher Towle Clapp & Soans Attys

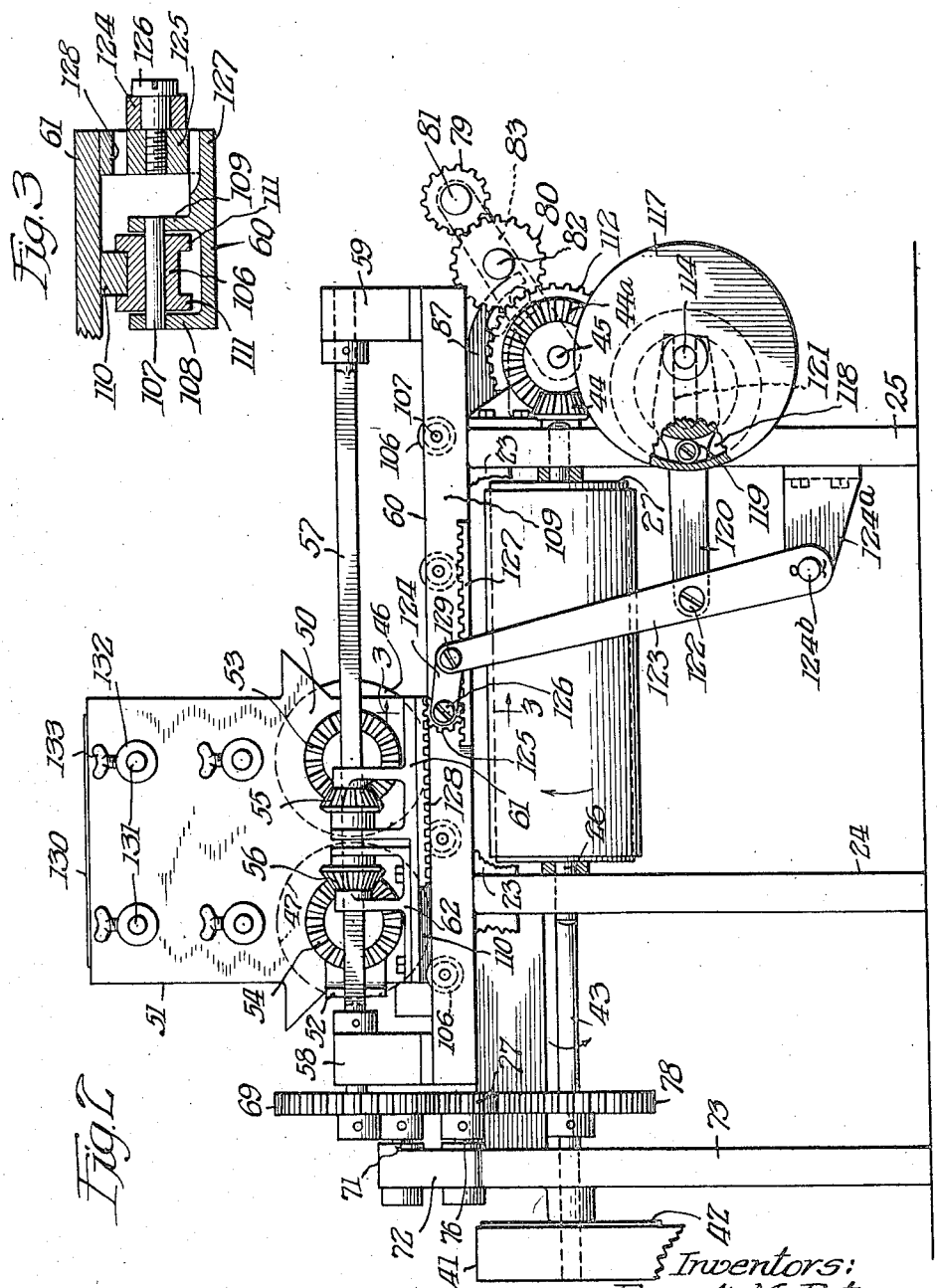

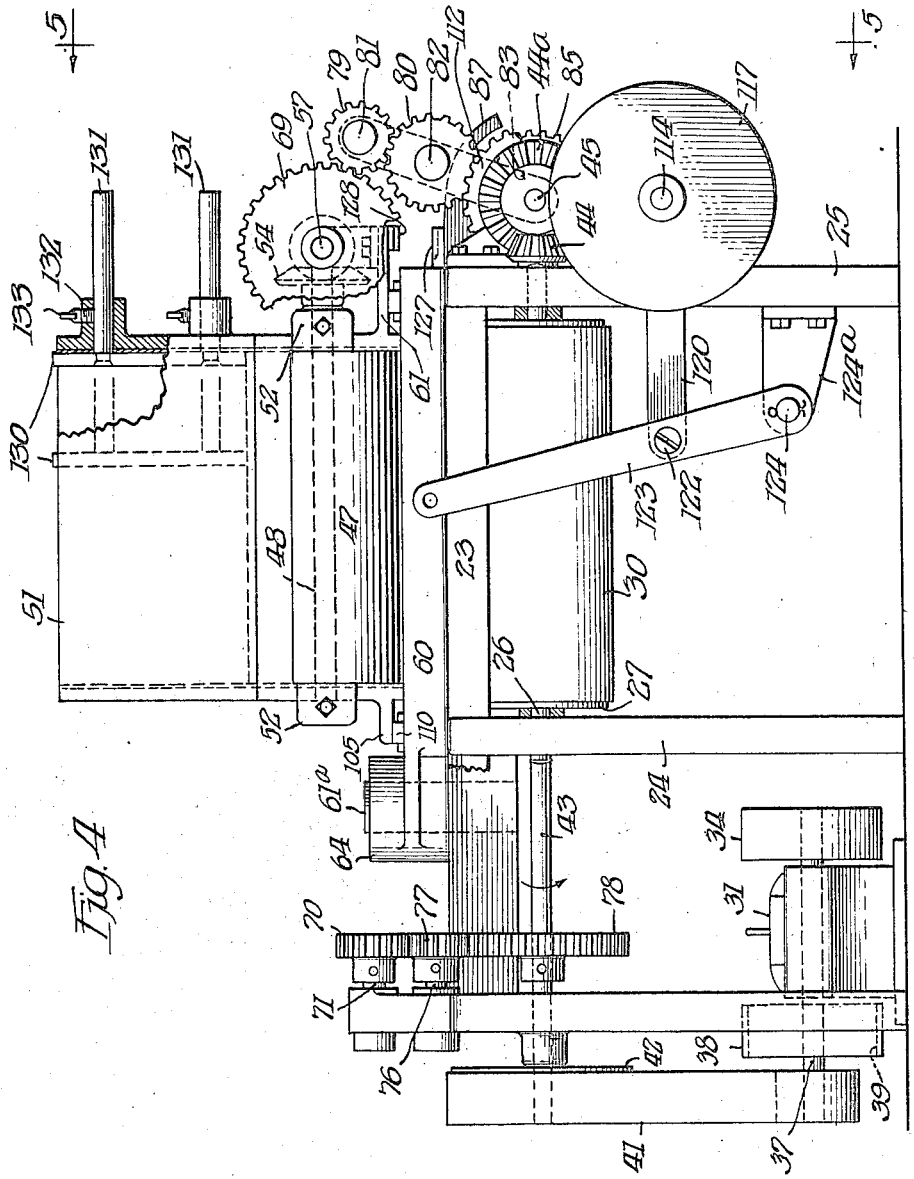

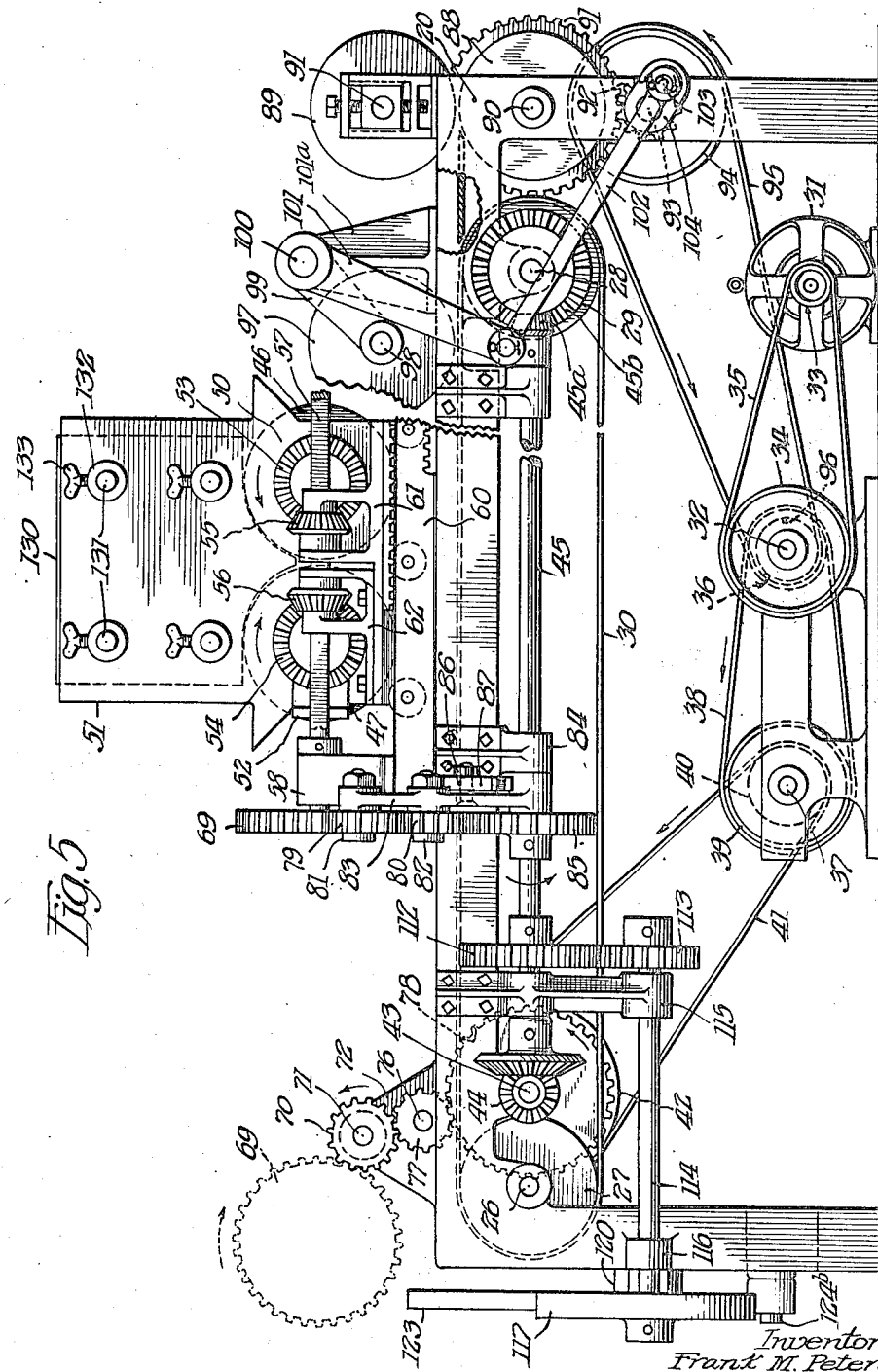

May 15, 1923.  
F. M. PETERS ET AL  
DOUGH SHEETING APPARATUS  
Filed Jan. 15, 1921    5 Sheets-Sheet 5  
1,455,120

Inventors:  
Frank M. Peters,  
Warren W. Hungerford,  
By Fisher Towle Clapp & Soans  
Attys.

Patented May 15, 1923.

1,455,120

UNITED STATES PATENT OFFICE.

FRANK M. PETERS AND WARREN H. HUNGERFORD, OF CHICAGO, ILLINOIS, ASSIGNORS TO PETERS MACHINERY COMPANY, OF CHICAGO, ILLINOIS, A CORPORATION OF ILLINOIS.

DOUGH-SHEETING APPARATUS.

Application filed January 15, 1921. Serial No. 437,390.

*To all whom it may concern:*

Be it known that we, FRANK M. PETERS and WARREN H. HUNGERFORD, both citizens of the United States, residing at Chicago, in the county of Cook and State of Illinois, have invented certain new and useful Improvements in Dough-Sheeting Apparatus, of which the following is a specification.

Our invention has reference to dough sheeting apparatus, and has particular application to apparatus for making sponge dough, i. e., dough in which the rolling must be effected in two directions at an angle to each other. The invention is also of special value in connection with machines for rolling either sponge dough or sweet dough, i. e., dough used for cakes or cookies, and which does not require cross-rolling.

The principal objects of the invention are to provide an improved machine in which cross-rolling or longitudinal rolling can be accomplished at the option of the operator; to provide an improved machine for effecting a continuous cross-rolling of the dough, and a subsequent longitudinal rolling thereof; to provide improved mechanism for delivering and distributing the dough sheet to a travelling belt conveyor; to provide an improved arrangement for quickly and conveniently changing or converting the apparatus from a cross-rolling machine to a straight or longitudinal rolling machine, or vice versa; to provide an apparatus which shall be simple in design and manufacture while being efficient and economical to maintain and operate, and in general to provide an improved dough rolling apparatus of the character referred to.

Certain parts of the machine which we have selected as illustrative of a specific application of our invention are in the nature of a modification or improvement on the construction shown in Frank M. Peters U. S. Patent No. 881,439 for dough sheeting machine, issued March 10, 1908.

In the drawings of our said machine accompanying this specification,

Fig. 2 is an end elevation of the machine.

Fig. 3 is a section taken on the line 3—3 of Fig. 2.

Fig. 4 is a view similar to Fig. 2, but showing the machine arranged for rolling of sweet dough instead of sponge dough.

Fig. 5 is a side view of the machine looking in the direction of arrow 5 in Fig. 4.

Figure 1:
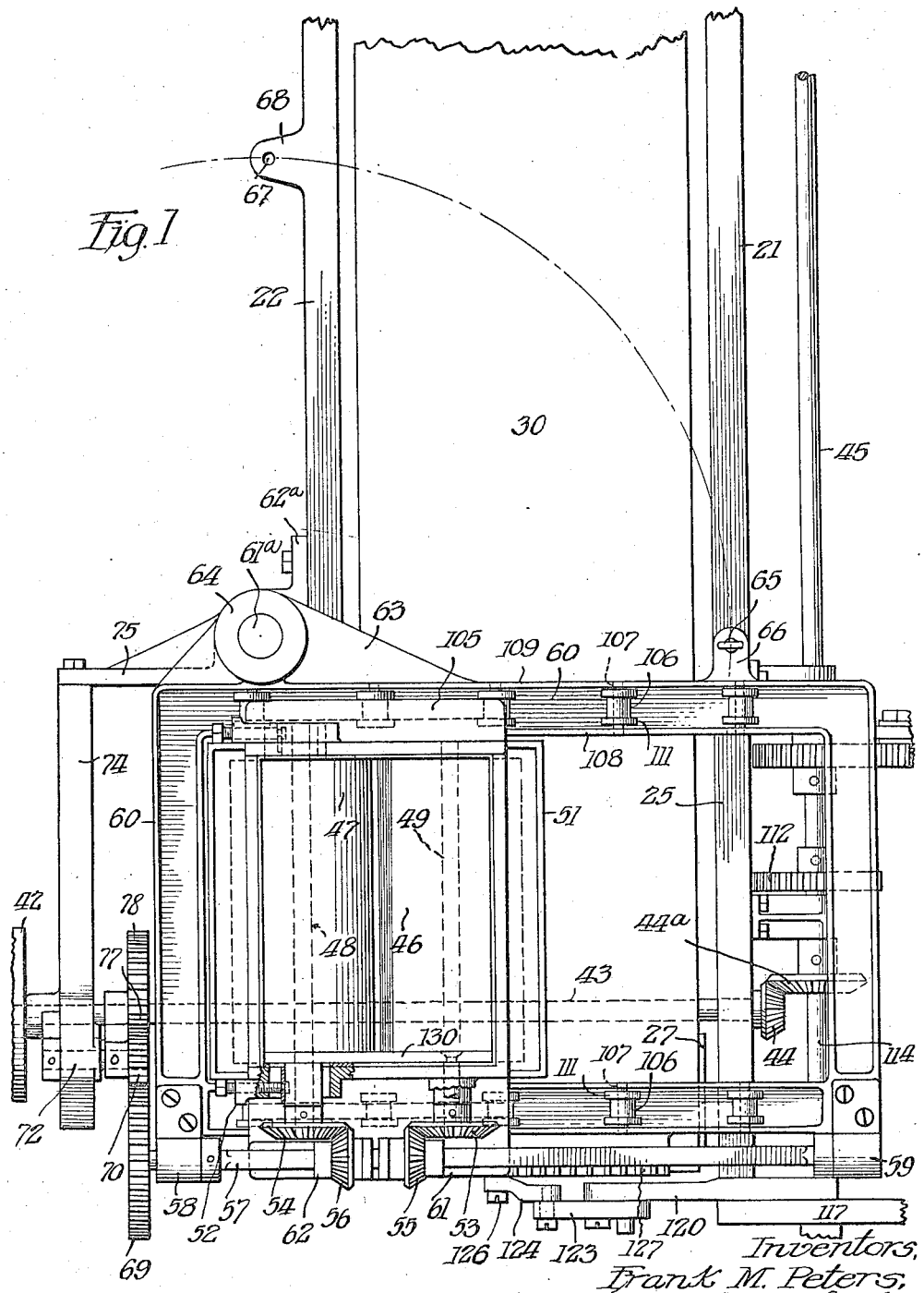
Fig. 1 is a plan view of the principal portion of the machine.
Figure 6:
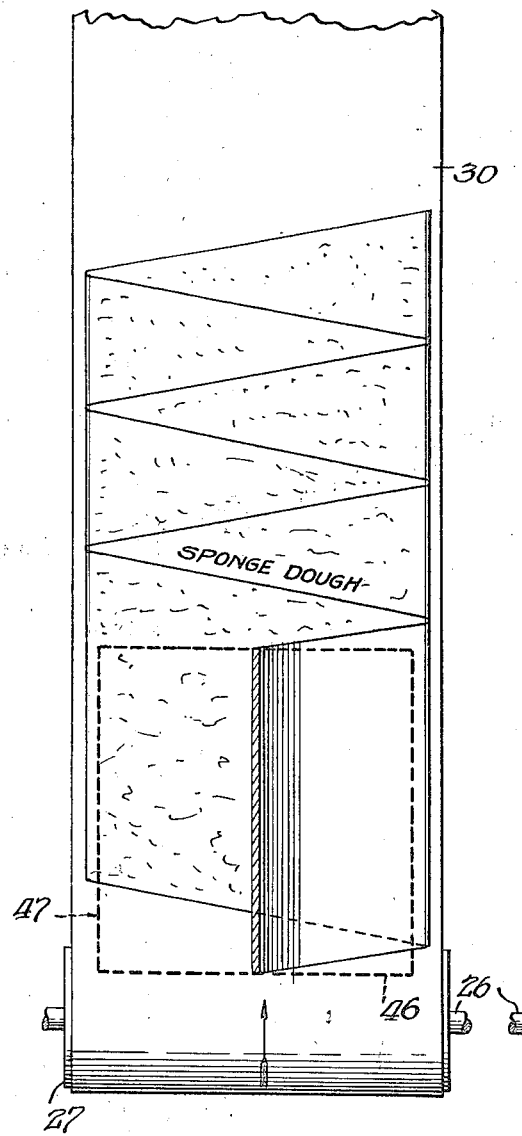
Fig. 6 is a plan view showing the manner in which the sponge or cross-rolled dough is carried away by the belt conveyor.
Figure 7:
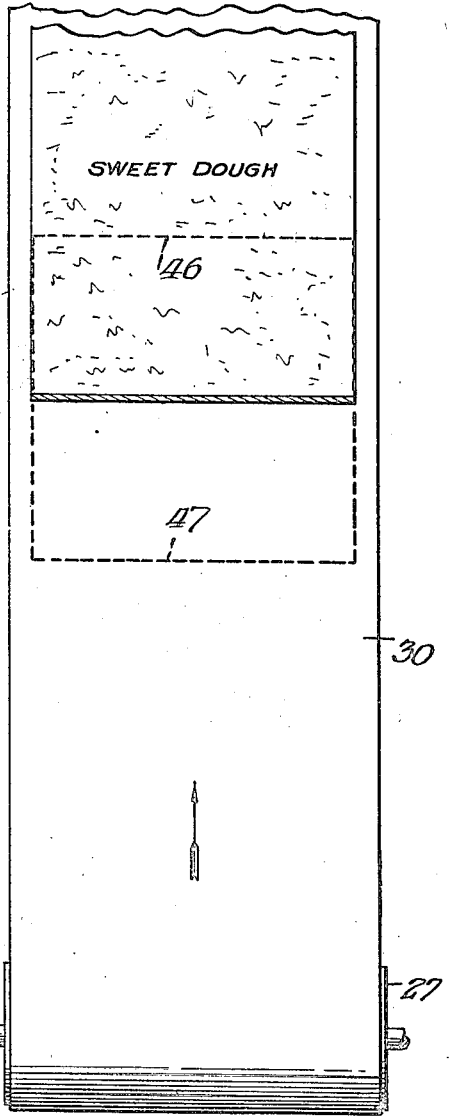
Fig. 7 is a view similar to Fig. 6, but showing the manner in which the sweet dough is delivered.

Referring to the drawings, it will be observed that the principal operating parts of the machine are mounted upon a cast iron frame or foundation designated as a whole 20, such frame 20 comprising a pair of longitudinal side members, 21 and 22, and a pair of end members, one of which is indicated at 23. The frame is raised from the floor by columns or standards, for instance, as at 24 and 25.

At one end of the machine a shaft 26 is journaled transversely in the legs 24 and 25, on which shaft there is keyed a drum, 27. At the other end of the machine is another similarly disposed shaft 28, carrying a similar drum, 29, and around said pair of drums there is trained a belt conveyor, 30. Said conveyor is driven through the shaft 28, by the following mechanism:

A motor, 31, is mounted beneath the machine and drives a transversely arranged shaft 32, by means of a pair of belt pulleys, 33 and 34, connected by a belt, 35. Said shaft 33, by means of a pulley, 36, keyed thereto, drives a countershaft 37, through a belt 38 and pulley 39, keyed to said countershaft 37. It will be understood that the shafts 32 and 37 are journaled in suitable supporters or pedestals which may be either independently secured to the floor, as shown in Fig. 5, or connected to the frame in any suitable manner.

On the shaft 37, there is keyed a belt pulley, 40, which, by means of a belt, 41, drives a pulley, 42, keyed to a transverse shaft, 43, journaled transversely in the frame of the machine. On the opposite end of said shaft 43, there is keyed a bevel pinion, 44, meshing with a bevel gear 44ª, keyed to the end of a longitudinal shaft 45. On the opposite end of shaft 45 there is keyed a bevel pinion 45ª which drives bevel gear 45ᵇ keyed on the shaft 28. It will be understood that by the above described train of mechanism, the drum 27 and belt 30 carried thereby may be driven continuously in such direction that the top stretch of the belt moves from left to right as shown in Fig. 5.

The shaft, 43, also drives the initial set of dough rollers, 46 and 47. Said initial rollers 46 and 47 are mounted upon parallel shafts 48 and 49. Shafts 48 and 49 are journaled in a cast iron housing, 50, the upper part of which constitutes a hopper, 51, in which the batches of dough are introduced by the operator of the machine.

The shaft 49 is stationarily journaled in the hopper housing 50, while the other shaft 48 is carried in a journaled frame as a part of an integral bracket 52, one at each end of the shaft, said brackets 52 being slidably mounted in the housing 50, so that the roll 47 may be moved towards or from the roll 46 whenever it is desired to regulate the thickness of the dough sheet formed and delivered by the said pair of rollers. Said rollers are independently driven by bevel gears, 53 and 54, keyed to the end of the roll shafts 48 and 49, said bevel gears 53 and 54 mesh with a pair of oppositely disposed bevel pinions 55 and 56, mounted to slide upon, and adapted to be driven by a square shaft 57, journaled in suitable bearings, as at 58 and 59, and secured to the top of a rectangular swinging frame 60. Said bevel gears 55 and 56 are positioned axially, in order to insure correct meshing with the beveled gears 53 and 54, by forked brackets 61 and 62, through the ends of which the shaft 57 passes.

It will be observed that the forked bracket 61 is made as a permanent part of the lower end of the roll housing 50, while the forked bracket 62 is slidable toward or from the bracket 61, in order to allow for change in spacing of the rolls. To facilitate said adjustment and to maintain the bevel gears 54 and 56 permanently in correct mesh, the sliding bracket 52 and the sliding forked bracket 62 are preferably integrally connected, or made as a single casting so that they may be simultaneously adjusted. The swinging movement of the frame 60 is effected by means of a pivotal connection with the main frame, said pivotal connection comprising a stationary pin or trunnion 61ª, projecting upwardly from a bracket 62ª, secured to the side of the main frame. The frame 60 is formed with an integral bracket or web 63, having a boss 64, bored out to accommodate the fixed trunnion 61ª. The frame 60 is arranged to swing through an angle of 90 degrees with reference to the main frame, and in a horizontal plane, so that the axes of the rolls 46 and 47 can be positioned either at right angles to the axis of the belt drum 27 or parallel therewith.

In the position of the parts shown in Fig. 1, the frame 60 is arranged crosswise of the main belt 30, with the rolls at right angles to the axis of the belt drum 27, so that the dough sheet is delivered crosswise of the belt. In such position the frame 60 is supported upon the finished upper surfaces of the side frames 21 and 22, axially swinging movement of said frame being prevented by a lock-pin 65 inserted through a lug 66 in the frame 60 and entering a suitable aperture in the top of the side frame 21. Such is the position of the swinging frame and rolls carried thereby, when it is desired to cross-roll the dough sheet.

When it is desired to make sweet dough, in which case it is not necessary or desirable to cross-roll the material, the frame 60 is swung through an angle of 90 degrees into such position that the lock-pin 65 (see Fig. 1) can be inserted in an aperture 67, in a lug 68 on the side frame 22, thus bringing the rolls into a position parallel with the belt drum 27 (as shown in Fig. 5) so that the dough sheet is delivered by the rolls to the belt longitudinally of the latter.

We will now describe the mechanism for actuating the rolls when the frame 60 is in its different positions. Describing first the mechanism for driving the rolls 46 and 47 when they are positioned for cross rolling as in Fig. 1, it will be observed that when the frame is in said position, the spur gear 69 which is keyed to the end of shaft 57, is in engagement with an intermediate gear 70, which gear 70 rotates on a fixed pin 71 at the upper end of a bracket 72 formed as an integral extension of the upper portion 74 of the L-shaped standard 73. The upper or horizontal limb of said standard is bolted to the outer end 75 of the bracket 62ª in which the pin 61 is mounted.

In the bracket 72 there is also fixed a pin 76 which carries another intermediate gear 77, said intermediate gear 77 meshing with gear 70 and a large gear 78 keyed on the shaft 43. It is manifest that when the motor shaft is energized, the rolls, when in such cross-rolling position will be driven through shafts 32, 37, 43, gears 77, 70, 69, shaft 57, the bevel pinions 55 and 56 meshing with the bevel gears 53 and 54 on the roll shaft.

When it is desired to arrange the apparatus for the rolling of sweet dough, that is to say, dough which does not require cross-rolling, the pin 65 is removed, permitting the frame 60 to be swung through an angle of 90 degrees, and then pin 65 is inserted in the locking aperture 67. Such position is shown in Figs. 4 and 5 of the drawings. When in such position, the roll-actuating gear 69 is driven through a train of intermediate gears 79 and 80 mounted on shafts 81 and 82, carried by swinging arm 83. Said arm is pivoted concentrically with the shaft 45 on a bracket 84, the gear 80 being thus always in mesh with spur gear 85 keyed to said shaft 45. The arm 83 may be locked in such position that the gear 79 will engage and mesh with the roll-actuating gear 69 by means of a bolt 86, which is fixed in the arm 83 and passes through an arcuate slot in the flange 87 of the bracket 84. It will thus be seen that when the apparatus is arranged for sweet dough, the actuation of the rolls is effected through shaft 43, bevel pinion 44, bevel gear 44ª, shaft 45, spur gears 85, 80, 79 and 69.

It will be observed that when the apparatus is arranged for the cross-rolling of sponge dough, the speed of rotation of the rolls is considerably greater than in the case where the apparatus is arranged for the rolling of sweet dough, as will be apparent from an examination of the sizes of the gears in each of the respective trains. The apparatus is also equipped with the necessary finishing rolls for effecting the final rolling out of the dough sheet to the required thickness. Said finishing rolls 88 and 89 are mounted on a fixed shaft 90 and an adjustable or slidable shaft 91. The driving of said rolls 88 and 89 is effected through spur gear 91 keyed to the shaft 90, said gear 91 being driven by a pinion 92 on a shaft 93. The shaft 93 is journaled in the legs of the frame and carries a belt pulley 94 which is driven from the shaft 32 by a belt 95 which passes around a belt pulley 96 keyed to said shaft 32.

The apparatus also includes kneading roller 97, which is mounted on a shaft 98 journaled in the ends of a pair of swinging arms 99, said arms 99 being keyed to the opposite ends of a shaft 100, which is journaled in a pair of brackets 101ª, mounted on opposite sides of the main frame of the machine. Said rock shaft 100 is oscillated by means of a downwardly extending rock arm 101, to the lower end of which there is pivotally connected one end of a pitman or connecting rod, 102, the other end of which rod is pivotally connected to a crank pin 103 of a crank 104, keyed to the outer end of shaft 93.

When the apparatus is arranged for cross-rolling as shown in Figs. 1 and 2, the hopper housing 51 with its associated rolls 46 and 47, is adapted to be reciprocated cross-wise of the belt, that is to say, in a direction parallel with the axes of the belt drum 27. To this end, the hopper housing is provided at its lower end with a pair of flanges, 105, and the flange 61, previously described, said flanges being supported by two rows of rollers, as 106, mounted to rotate freely on pins, 107, supported at the same level on opposite sides of the frame 60. Preferably said pins 107 have opposite ends fixed in flanges, for instance 108 and 109 projecting upwardly from the frame 60, the rollers 106 rotating freely upon said pins, (see Fig. 3), also, in order to prevent the hopper housing from driving sideways, guide brackets 110 secured to the under sides of the hopper housing flanges 61 and 105, said brackets 110 fitting between similar flanges 111 on the sides of said rollers 106.

The reciprocating movement of the hopper housing back and forth crosswise of the belt along the track rolls is effected by means of the following mechanism: Referring to Fig. 5, it will be observed that a spur gear 112 which is keyed to the longitudinal shaft 45, is arranged to mesh with a drive spur gear 113, keyed to the end of a longitudinally arranged jack shaft 114, rotatably supported at the one end in the lower end of the bracket 115, the other end of said shaft 114 being journaled in a small bearing 116, on one of the legs of the machine. The outer end of said shaft 114 carries keyed thereto a cam 117, having formed therein a cam groove, 118, in which groove rolls a cam roll 119, pivotally mounted on a cam rod 120. One end of said cam rod is forked, as shown at 121, in order to straddle and be guided by the shaft 114, and the other end of said cam rod 120 is pivotally connected to a pin 122, which is fixed on the rock arm 123, intermediate of the ends thereof.

The lower end of said rock arm 123 is pivotally mounted on a fixed pin 124ᵇ carried on the end of a small bracket, 124ª bolted to one of the legs of the machine and the upper end of said rock arm 123 is pivotally connected by means of a link 124, with a spur pinion 125. Said spur pinion 125 rotates on a pin 126, fixed on the end of said link 124, and meshes with a pair of horizontally opposed racks 127 and 128. The rack 127 is stationary and may be formed as a part of one side of the frame 60, while the other rack 128 may be formed as a part of or secured to the under side of the flange 61 of the hopper housing. The effect of the pinion 125 and the racks 127 and 128 is to double the extent of movement of the hopper housing 50 on the swinging frame 60, with respect to the movement of the rock arm 123. It will be manifest, that by reason of the just-described train of mechanism, the hopper housing will make a complete reciprocation back and forth across the belt during each revolution of the shaft 114.

When it is desired to change the machine from the position shown in Figs. 1 and 2 to the position shown in Figs. 4 and 5, the pin 129 which forms the connection between the link 124 and the rock arm 123 is removed, permitting link 124 and gear 125 to be detached, thereby preventing interference with the swinging movement of frame 60 when the machine is being changed over.

It will also be observed that when the machine is in the position shown in Figs. 1 and 2, for cross-rolling, the arm 83 is swung down into the position shown in Fig. 2, so that the gears 79 and 80 are out of the way and will form no obstruction when the frame is being swung around for the purpose of arranging the apparatus for the longitudinal rolling of sweet dough.

In some cases it is desired to roll out a sheet of dough of less width than the maximum permitted by the dimensions of the machine. This is made possible by arranging in the hopper, a movable partition, 130, the lower end of which is suitably conformed to the curvature of the rolls 46 and 47. Said partition 130 is secured to the ends of a set of sliding rods 131, which pass through suitably bored out bosses 132 formed on one side of the hopper 51. By means of set-screws 133, the partition 130 is secured in any desired position of adjustment.

It will be understood that the described details of construction and operation are merely illustrative of a single application of our invention, the scope of which should be determined by reference to the appended claims, said claims being construed as broadly as possible, consistent with the state of the art.

We claim as our invention:

1. In dough rolling apparatus, the combination of a travelling conveyor, roll means arranged to deliver a dough sheet to said conveyor, and means for swinging said roll means to change the delivery of the dough sheet relative to the direction of travel of the conveyor.

2. In dough rolling apparatus, the combination of a frame, dough rolling apparatus mounted on said frame, a belt conveyor located below said frame and provided with an axially horizontal drum as a support therefor, and means for swinging said frame into a plurality of different angular positions relative to the axis of said drum.

3. Dough sheeting apparatus comprising an axially horizontal conveyor drum, a belt conveyor supported by said drum, means for advancing said belt conveyor, a support, a frame mounted on said support above said belt and arranged to swing through a horizontal angle of substantially ninety degrees, a hopper and a pair of rolls mounted on said frame, the arrangement permitting delivery of the dough sheet either longitudinally or cross-wise of the belt, and means for actuating said rolls when the frame is in either position.

4. Dough sheeting apparatus comprising a main frame, a belt conveyor arranged lengthwise on said frame, an upper swinging frame mounted on said main frame above said belt conveyor, an axially vertical pivot means connecting said swinging frame and said main frame and permitting swinging movement of said upper frame in a substantially horizontal plane, means for locking said swinging frame in different angular positions with reference to said main frame, a hopper on said swinging frame, rolls journaled on said swinging frame under said hopper, and means for driving said rolls in either position of adjustment of the swinging frame.

5. Dough sheeting apparatus comprising a belt conveyor, a pair of rolls for forming a dough sheet and delivering same cross-wise of the conveyor, and means for bodily reciprocating said rolls as a unit cross-wise of the belt.

6. Dough sheeting apparatus comprising a main frame, an axially horizontal drum carried by said frame, a conveyor belt supported by said drum, an upper extension on said main frame provided with track means located above the belt and extending cross-wise thereof, a carriage, means for reciprocating said carriage along said track means, a pair of rolls mounted on said carriage with their axes at right angles to said track means, means for actuating said rolls continuously during the reciprocatory movement of said carriage, and means synchronized with the roll actuating means for continuously driving said belt conveyor in timed relation with said rolls.

7. Dough sheeting apparatus comprising, in combination, a frame, a carriage mounted to reciprocate cross-wise of said frame, a shaft journaled in said frame, having its axis parallel with the direction of reciprocatory movement of said carriage, a hopper on said carriage, a pair of parallel rolls journaled on said carriage at the bottom of said hopper, and gear means for driving said rolls from said shaft including a gear slidable with reference to said shaft, but normally fixed against slidable movement relative to the carriage.

8. In dough sheeting apparatus, the combination of a main frame, a drum mounted on said main frame to rotate on a substantially horizontal axis, a belt supported by said drum means for continuously advancing said belt, a carriage mounted on the upper end of said frame to reciprocate cross-wise of the belt, a hopper mounted on said carriage, a pair of co-operating dough rolls mounted in the lower end of said hopper to rotate on an axis substantially at right angles to the axis of the drum, means for continuously rotating said rolls during the reciprocatory movement of said carriage, including gearing on said carriage, and a shaft parallel with the drum axis and journaled in the frame, in continuous driving engagement with said gearing.

9. In dough sheeting apparatus the combination of a main frame, a drum mounted on said main frame to rotate on a substantially horizontal axis, a belt supported by said drum, means for continuously advancing said belt, a carriage mounted on the upper end of said frame to reciprocate cross-wise of the belt, a hopper mounted on said carriage, a pair of co-operating dough rolls mounted at the lower end of said hopper to rotate on an axis substantially at right angles to the axis of the drum, means for continuously rotating said rolls during the reciprocatory movement of said carriage, and means for reciprocating said carriage on said frame, comprising a rotary cam having its axis at right angles to the drum axis and means connecting said cam with said carriage.

10. In dough sheeting apparatus the combination of a main frame, a drum mounted on said main frame to rotate on a substantially horizontal axis, a belt supported by said drum, means for continuously advancing said belt, a carriage mounted on the upper end of said frame to reciprocate cross-wise of the belt, a hopper mounted on said carriage, a pair of co-operating dough rolls mounted at the lower end of said hopper to rotate on an axis substantially at right angles to the axis of the drum, means for continuously rotating said rolls during the reciprocatory movement of said carriage, and means for reciprocating said carriage on said frame, comprising a rotary cam having its axis at right angles to the drum axis and means connecting said cam with said carriage, said connecting means comprising an upstanding lever having its lower end pivotally connected to said frame, its upper end connected to said carriage and an intermediate point in its length connected to said cam.

11. In combination a pair of parallel rolls for forming and delivering a dough sheet and means for carrying away the sheet of dough from said rolls optionally in a direction parallel with the roll axes, or in a direction at right angles to the roll axes.

12. In combination a pair of rolls for forming a dough sheet and delivering same, a traveling belt conveyor for receiving and carrying away said sheet, and means for changing the position of the belt conveyor relative to the position of the rolls whereby the delivery of the dough sheet to the belt may be effected cross-wise or longitudinally thereof.

13. In dough sheeting apparatus, the combination of a belt conveyor, a skeleton frame having a part extending cross-wise and over the belt, a dough hopper housing, a pair of parallel rolls mounted on said housing, an anti-friction means interposed between said part and said housing permitting free reciprocatory movement of the housing over and cross-wise of the belt racks carried respectively by said part and said housing, a gear meshing simultaneously with both of said racks and means for reciprocating said gear along said racks.

FRANK M. PETERS.
WARREN H. HUNGERFORD.